May 12, 1970 A. G. GRACE 3,512,109
PHASE ANGLE MODULATOR
Filed March 24, 1967 3 Sheets-Sheet 1

INVENTOR.
ALAN G. GRACE
BY
FOWLER, KNOBBE
& MARTENS
ATTORNEYS.

May 12, 1970 A. G. GRACE 3,512,109

PHASE ANGLE MODULATOR

Filed March 24, 1967 3 Sheets-Sheet 2

INVENTOR.
ALAN G. GRACE

BY
FOWLER, KNOBBE & MARTENS
ATTORNEYS.

May 12, 1970 A. G. GRACE 3,512,109

PHASE ANGLE MODULATOR

Filed March 24, 1967 3 Sheets-Sheet 3

INVENTOR.
ALAN G. GRACE

BY
FOWLER, KNOBBE
& MARTENS
ATTORNEYS.

1

3,512,109

PHASE ANGLE MODULATOR

Alan G. Grace, San Carlos, Calif., assignor, by mesne assignments, to Allan R. Fowler, Orange, Calif., trustee

Filed Mar. 24, 1967, Ser. No. 625,756
Int. Cl. H03c *3/26;* H03h *17/60*
U.S. Cl. 332—16 17 Claims

ABSTRACT OF THE DISCLOSURE

First and second transistors each generate a current *i* proportional to the amplitude of the input signal. Another transistor pair, functioning as switches and responsive to the voltage on the capacitor, are retained in mutually exclusive states of conduction and nonconduction to alternately charge the capacitor in one direction from the current supplied by the first transistor and in the opposite direction from the current supplied by the second transistor. The capacitor is charged by the current *i* between voltage limits set by the switching transistors so that the charging period is a function only of the current *i*. A current transformer receiving the current flowing through the switching transistors, a limiter stage coupled to the transformer and an output amplifier stage coupled to the limiter provide the angle modulated signal as a symmetrical square wave whose polarity is positive when one of the switching transistors is ON and whose polarity is negative when the other of the switching transistors is ON.

BACKGROUND OF THE INVENTION

Field of the invention

This invention relates to angle modulators and particularly to multivibrator type modulators.

Description of the prior art

Multivibrator type angle modulators are generally simpler in construction than the heterodyne type modulator and are therefore less complicated and less expensive. Heretofore, however, this type of modulator has not proven entirely successful for use in the television field for such purposes as modulating a video waveform for magnetically recording same on a tape recorder. Typically, the prior art multivibrator modulators provide an exponential characteristic rather than the desired linear operation. Another problem associated therewith is that it has been very difficult to reduce the second harmonic component because of a difficulty of matching circuit components. Still another problem sometimes present in the prior art devices is that they are difficult to start in operation.

SUMMARY OF THE INVENTION

The present invention includes a single storage capacitor and a pair of linear transistor current generators which generate a current linearly proportional to the amplitude of the input video waveform at a given modulating signal frequency. Switching means coupled to the capacitor provide alternate charging cycles in which the capacitor is charged between first and second preset potentials by the first and second current generating transistors. In this manner, an extremely linear modulator is provided since the charging period is inversely proportional to the current produced by the current generator in accordance with the equation $$i=C\frac{dv}{dt}$$

Since C and $dv$ are determined by the circuit parameters, the time $\Delta t$ of the charging period is inversely proportional to the current produced by the transistor current generators.

2

This invention overcomes the aforementioned problems of the prior art multivibrator type modulator. As noted, its manner of operation inherently provides a linear response. Moreover, it utilizes a single storage capacitive element, thereby eliminating the matching problems and starting problems of the prior art devices.

Another feature of the invention is that a simple control enables the output signal to be balanced to provide a symmetrical square wave output and thereby compensate for variations in the circuit components used in the modulation stage.

DETAILED DESCRIPTION OF THE PREFERRED EMBODIMENT

Figure 1A:
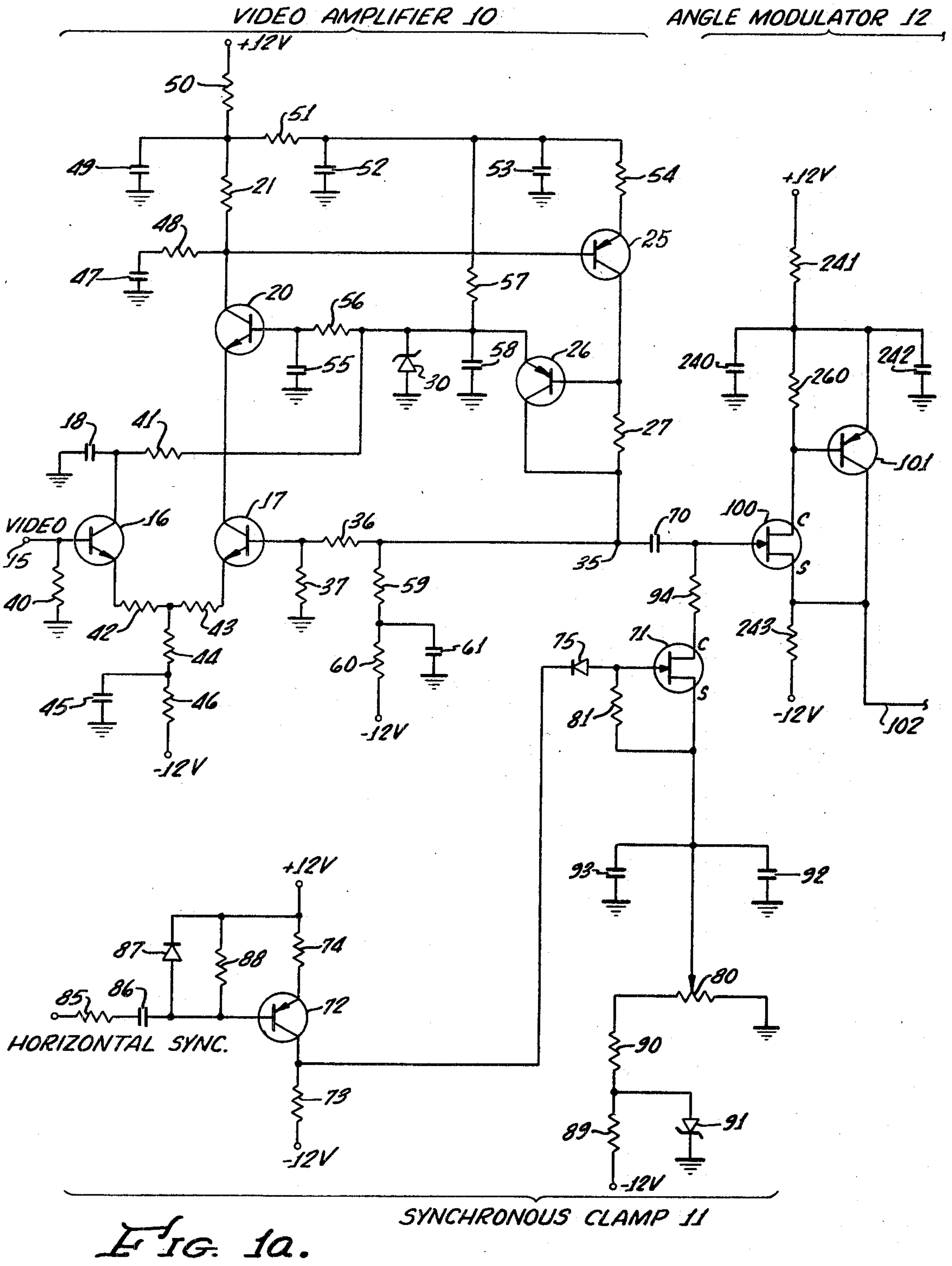
FIGS. 1*a* and 1*b* are a detailed circuit schematic of a video amplifier, synchronous clamp and angle modulated stages constructed in accordance with the present invention, and FIGS. 2*a, b, c* and *d* are waveforms produced on the capacitor and corresponding symmetrical square wave angle modulated output of the modulator stage of FIG. 1*b*.
Figure 1B:
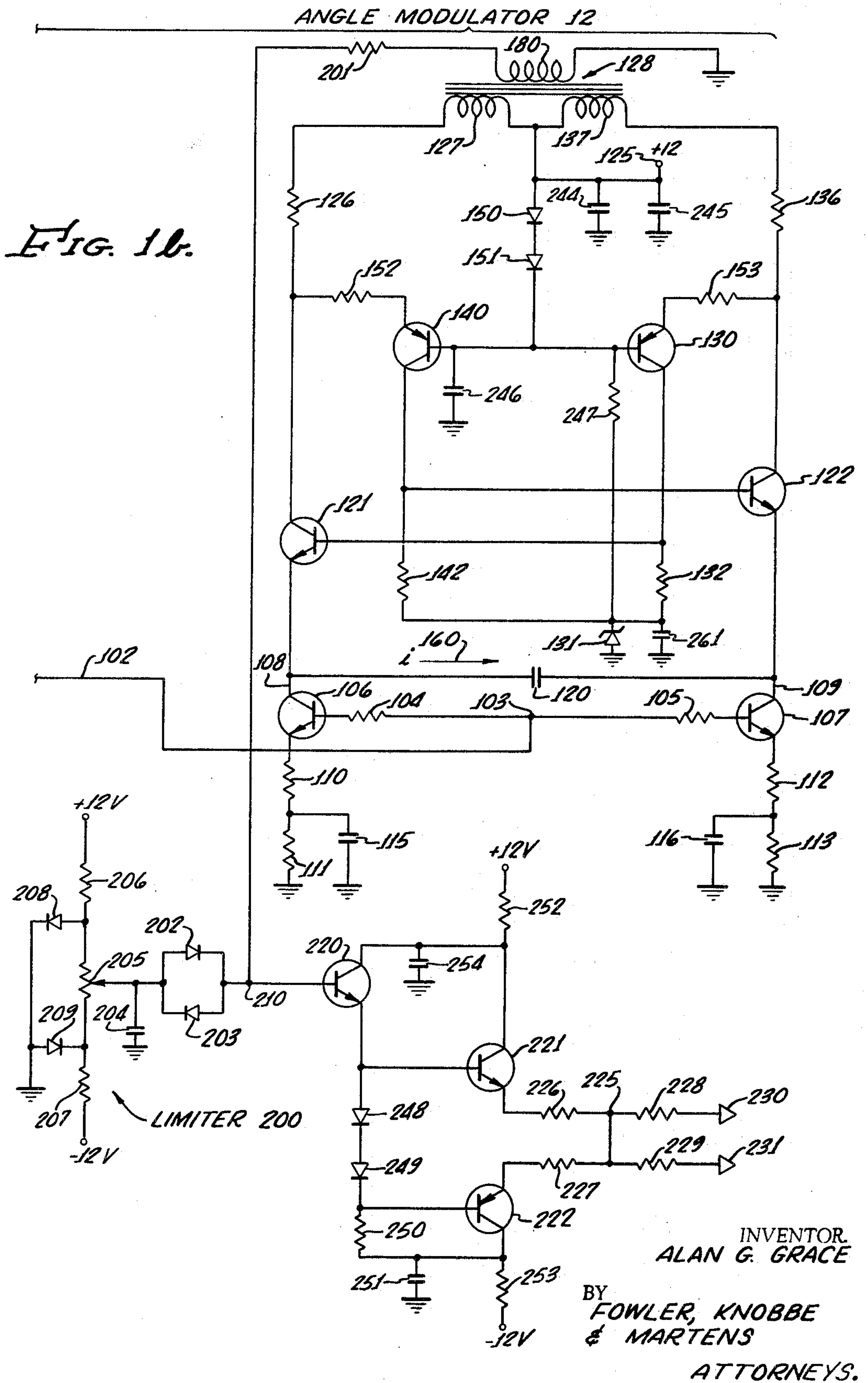

Referring now to FIGS. 1*a* and 1*b*, the input video signal is first amplified in a wide band video amplifier 10 whose output is connected to the input of a synchronous clamp 11 for restoring the DC potential level. The video waveform at the output of the synchronous clamp is connected to the input of the angle modulator stage 12 which produces a symmetrical square wave at its output corresponding to the angle modulation of the amplitude of the input video waveform.

*Video amplifier.*—The input video, typically produced by a television camera, is introduced at the input terminal 15 of the video amplifier 10. This terminal is connected to the base of transistor 16 providing in combination with transistor 17 a differential feedback amplifier. The collector of transistor 16 is stiffly decoupled by capacitor 18 so as to be maintained at virtual AC ground, thereby preventing any gain or voltage amplification on the collector of transistor 16. As a result, the value of capacitance across the input circuit—which would otherwise be present because of the collector to base capacitance of transistor 16—is minimized for maintaining a flat response over a wide bandwidth.

A low impedance is maintained on the collector of the other transistor 17 by connecting it to the emitter of transistor 20 which is connected as a grounded base amplifier. In this way, transistor 20 provides a low impedance isolation stage between the collector of transistor 17 and the load resistor 21, thereby minimizing the effect of the collector to base and collector to ground capacities of transistor 17 for providing a wide band video amplifier.

The collector output of transistor 20 is applied to the base of transistor 25. This latter transistor has degenerative feedback so that its input impedance and hence the shunting impedance across load resistor 21 is kept high over a wide video range, typical 100 MHz. Transistor 25 and transistor 26 form a feedback pair with the collector of transistor 25 being connected to resistor 27, one end of which is connected to the base of transistor 26 and the other end of which is connected to the collector of transistor 26. The emitter of transistor 26 is decoupled by Zener diode 30.

Node 35, the end of resistor 27 connected to the collector of transistor 26, is both the feedback and output terminal of the video amplifier. The feedback signal is applied through the resistors 36 and 37 to vary the gain of transistor 17.

By way of specific example, the following components and component values are advantageously used in the video amplifier described hereinabove:

Table I

Resistors:
- 21, 27 and 59—560 ohms
- 36 and 46—270 ohms
- 37 and 51—51 ohms
- 40—75 ohms
- 41 and 57—120 ohms
- 42 and 43—10 ohms
- 44—820 ohms
- 48—5.1 ohms
- 50 and 56—47 ohms
- 54—56 ohms
- 60—82 ohms Zener diode 30—5.6 v.

Capacitors:
- 18, 45, 49 and 55—.05 microfarad
- 52—25 microfarads
- 53, 58 and 61—.1 microfarad
- 47—330 microfarads
- 70—.0033 microfarad Transistors:
- 16, 17 and 20—2N3564
- 25 and 26—2N3640

Viedo amplifiers so constructed have a gain of 10 db and have a flat response to within 3 db over a 100 MHz. bandwidth.

*Synchronous clamp.*—The amplified video signal at output terminal 35 of amplifier 10 is capacitively coupled through capacitor 70 to the modulator stage 12. The DC level of the video signal is restored at this point by the synchronous clamp stage 11 which includes field effect transistor 71 and transistor 72. Transistor 72 receives a pulse train corresponding to the horizontal synch rate—typically obtained from a horizontal stripper stage (not shown). The collector of transistor 72 is connected through resistor 73 to a −12 volt potential and its emitter is connected through resistor 74 to a +12 volt potential. The collector of transistor 72 is also connected through diode 75 to the gate electrode of field effect transistor 71. During the horizontal synchronizing interval, transistor 72 is driven ON such that the cathode of diode 75 is driven positive and this diode is biased OFF. Under these circumstances, a small impedance, e.g. 300 ohms, appears between the collector and source terminals of this device. The right hand plate of capacitor 70 is then clamped to the potential existing on the variable potentiometer 80. The synchronous clamp thereby establishes a definite DC voltage level for the horizontal synchronizing pulses included in the composite video waveform and thereby provides a reference for the entire video signal including the black and peak white levels. During the remainder of the television signal, the horizontal synchronizing pulse is OFF, transistor 72 is OFF and diode 75 is forwardly biased by the −12 volt potential at the collector of transistor 72. Resistor 81, connected between the source and gate electrodes of field effect transistor 71, produces a negative bias between the source and gate thereby cutting OFF transistor 71. There is then a very high impedance between the collector and source electrodes, thereby effectively removing the synchronous clamp potential from the video line.

By way of specific example, Table II lists typical component values which are advantageously used in the synchronous clamp stage:

Table II

Resistors:
- 73—2.2K ohms
- 74 and 94—100K ohms
- 80—5K ohms
- 81—6.8K ohms
- 85 and 90—1K ohms
- 88—10K ohms
- 89—270 ohms Capacitors:
- 86—.1 microfarad
- 92—.05 microfarad
- 93—250 microfarads Diodes:
- 75 and 87—IN4154
- 91 Zener—8.2 v.

Transistors:
- 72—2N3638
- 71 (field effect)—FN485

*Angle modulator.*—During the description of the modulator and its operation, it is convenient to refer to typical operating conditions. Accordingly, by way of specific example, the following components and component values are advantageously used in the modulator circuit of FIGS. 1*a* and 1*b*.

Table III

Resistors:
- 104, 105, 228 and 229—47 ohms
- 110 and 112—22 ohms
- 111 and 113—82 ohms
- 126, 136, 152, 153, 252, 253—100 ohms
- 132 and 142—220 ohms
- 201—330 ohms
- 205—200 ohms
- 206, 207 and 243—1.5K ohms
- 226 and 227—5.1 ohms
- 241—51 ohms
- 250—820 ohms
- 260—680 ohms Capacitors:
- 115 and 116—2000 picofarads
- 120—270 microfarads
- 204, 242, 244, 246, 251 and 254—0.5 microfarad
- 240—25 microfarads
- 245—50 microfarads
- 261—.22 microfarad Diodes:
- 131 (Zener)—8.2 v.
- 150, 151, 202, 203, 208, 209, 248 and 249—IN4148

Transistors:
- 100 (field effect)—FN485
- 101—2N3638
- 106 and 107—S16923
- 121, 122 and 220—2N3564
- 130 and 140—2N3640
- 221—SS57
- 222—SS2174

Primary windings
- 180—24 turns
- 127 and 137—3 turns

The input stage of the modulator 12 comprises field effect transistor 100 and transistor 101 (FIG. 1*a*) which together form a very high impedance stage with unity gain. The output lead 102 of this input stage is connected to node 103 (FIG. 1*b*) which is connected to both resistors 104 and 105. The other end of resistor 104 is connected to the base of transistor 106 and the other end of resistor 105 is connected to the base of transistor 107. These transistors provide respective first and second means for generating a current in their respective collector paths 108 and 109 proportional to the amplitude of the video signal applied to node 103. The emitters of each of these transistors 106 and 107 are connected to ground through respective resistors 110, 111 and 112, 113. Each of the resistors 111 and 113 are shunted by respective capacitors 115 and 116.

Shunting capacitors 115 and 116 provide a pre-emphasis network for increasing the magnitude of current generated as the capacitive reactance of these capacitors becomes small compared to the resistance of resistors 111 and 113. The magnitude of current flow through the current generating transistors 106, 107 is basically the potential applied to node 103 less the emitter-base potential of the transistor divided by the impedance between the transistor emitter and ground. For example, if the input signal is changing at a rate of 100 kHz. and has a magnitude change of 2 volts, the current is approximately 2 divided by 104 or 19.2 milliamps peak to peak excursion in both transistors 106, 107 since the capacitive impedance of the shunt capacitors 115, 116 are high relative to the resistors 111, 113 at this frequency. The same 2 volt excursion at a frequency of 5MHz. will produce a higher current of the order of 50 milliamps because of the decreased impedance in the emitter circuit of the transistors 106, 107 produced by the capacitors 115, 116.

A single capacitor 120 is connected between the collector of transistor 106 and the collector of transistor 107. Switching transistors 121 and 122 are respectively coupled to the current paths 108 and 109 by respectively connecting their emitter electrodes to the collector electrodes of transistors 106 and 107. The function of the switching transistors is to alternately connect capacitor 120 in series with one of the current generating transistors so that current flows in one direction through the capacitor and then in series with the other of the current generating transistors so that current flows in the opposite direction through the capacitor. Current flow is maintained in a given direction through the capacitor until it charges from a first predetermined potential to a second predetermined potential as determined by the switching means.

Switching transistors 121 and 122 are maintained in mutually exclusive states of conduction and nonconduction. Thus, switching transistor 121 has its collector connected to the +12 volts potential terminal 125 through resistor 126 and primary winding 127 of transformer 128. Base electrode of transistor 121 is connected to the collector electrode of transistor 130 and also to Zener diode 131 through resistor 132. The bias potential on this base electrode is then that of the Zener diode (8.2 volts) when transistor 130 is OFF and the Zener diode potential plus the voltage drop across resistor 132 when transistor 130 is ON.

Similarly, switching transistor 122 has its collector connected to the +12 volts potential terminal 125 through resistor 136 and primary winding 137 of transformer 128. Base electrode of transistor 122 is connected to the collector electrode of transistor 140 and also to Zener diode 131 through resistor 142. The bias potential on this base electrode is that of the Zener diode when transistor 140 is OFF and the Zener diode plus the voltage drop across resistor 142 when transistor 140 is ON.

Transistors 130 and 140 are biased from the 12 volt supply through respective diodes 150 and 151 so their bases are maintained at approximately 10.8 volts with a typical voltage drop across each diode of .6 volt. The emitters of these transistors are connected through respective resistors 152 and 153 to the collector electrodes of transistors 121 and 122.

The operation of the switching means including transistors 121, 122, 130 and 140 and the component values of Table III for providing the desired alternate charging of capacitor 120 is as follows: Assuming that switching transistor 121 is ON and switching transistor 122 is OFF and a video waveform is present at node 103, a current *i* proportional to the amplitude of this video waveform will be supplied in both conductive paths 108 and 109 by the two current generating transistors 106 and 107. The current flow through the transistor 107 in path 109 is then effectively connected in series with capacitor 120 to provide a current flow of amplitude *i* through this capacitor in the direction of arrow 160. Accordingly, path 108 and capacitor 120 are coupled in parallel. Since current *i* is flowing in each of these paths, a current of 2*i* flows through resistor 126 and the then ON switching transistor 121. Typically, the value of 2*i* over the modulation spectrum is of the order of 20 milliamps. This magnitude of current flow through resistor 126 reduces the bias applied to the emitter of transistor 140 to approximately 10 volts so that this transistor is turned OFF as soon as current flows through the transistor 121. The base of OFF transistor 122 is then held at the Zener potential of 8.2 volts.

In the assumed condition with transistor 122 OFF, the only current flow through resistor 136 is that drawn by transistor 130. This current flow is sufficiently small so that this transistor remains biased ON and provides a flow of current of the order of 2.5 milliamps through resistor 132. Accordingly, the base of transistor 121 is biased at the Zener diode potential (8.2) plus the voltage drop across resistor 132 (.6 volt) or approximately 8.8 volts. The emitter of transistor 121 is then held at 8.1 volts (the emitter potential of 8.8 volts less the base to emitter drop which is of the order of .7 volt). Hence, the emitter of transistor 121 and hence the left-hand plate of capacitor 120 is held at 8.1 volts with respect to ground so long as switching transistor 121 is ON. This is illustrated in FIG. 2*b* at 170.

The current *i* flowing through capacitor 120 produces a voltage change across the capacitor in accordance with the equation $$v=\frac{1}{C}\int idt \qquad (1)$$

If the current *i* is constant, the voltage change across the capacitor will be a linear ramp. Since the left-hand plate is held at a constant voltage, the right hand plate is forced to change as shown in FIG. 2*a* at 171. The voltage on this latter plate will fall from 8.7 volts until the emitter of the then OFF switching transistor 122 is biased sufficiently below its base potential so as to become conductive. This potential is typically 7.5 volts (the base potential of 8.2 less the emitter to base potential of .7 volt). Conduction of transistor 122 produces a flow of current of value 2*i* through resistor 136, resulting in the immediate cutoff of transistor 130. The potential at the base of transistor 121 is then reduced to the Zener potential and switching transistor 121 cuts off. The same cycle is then repeated, except, however, that capacitor 120 is effectively connected in series with current generating transistor 106 and charging current flows in a direction opposite to that of arrow 160. Accordingly, the right hand plate of capacitor 120 rises when transistor 122 conducts and is held at a constant 8.1 potential as shown at 172 in FIG. 2*a* whereas the left-hand plate is initially raised coincident with the rise on the right-hand plate to a level of 8.7 volts and then falls at a slope determined by the magnitude of the current *i* as shown at 173 in FIG. 2*b* until the potential of 7.5 volts is reached at which time switching transistor 121 again conducts.

Figure 2:
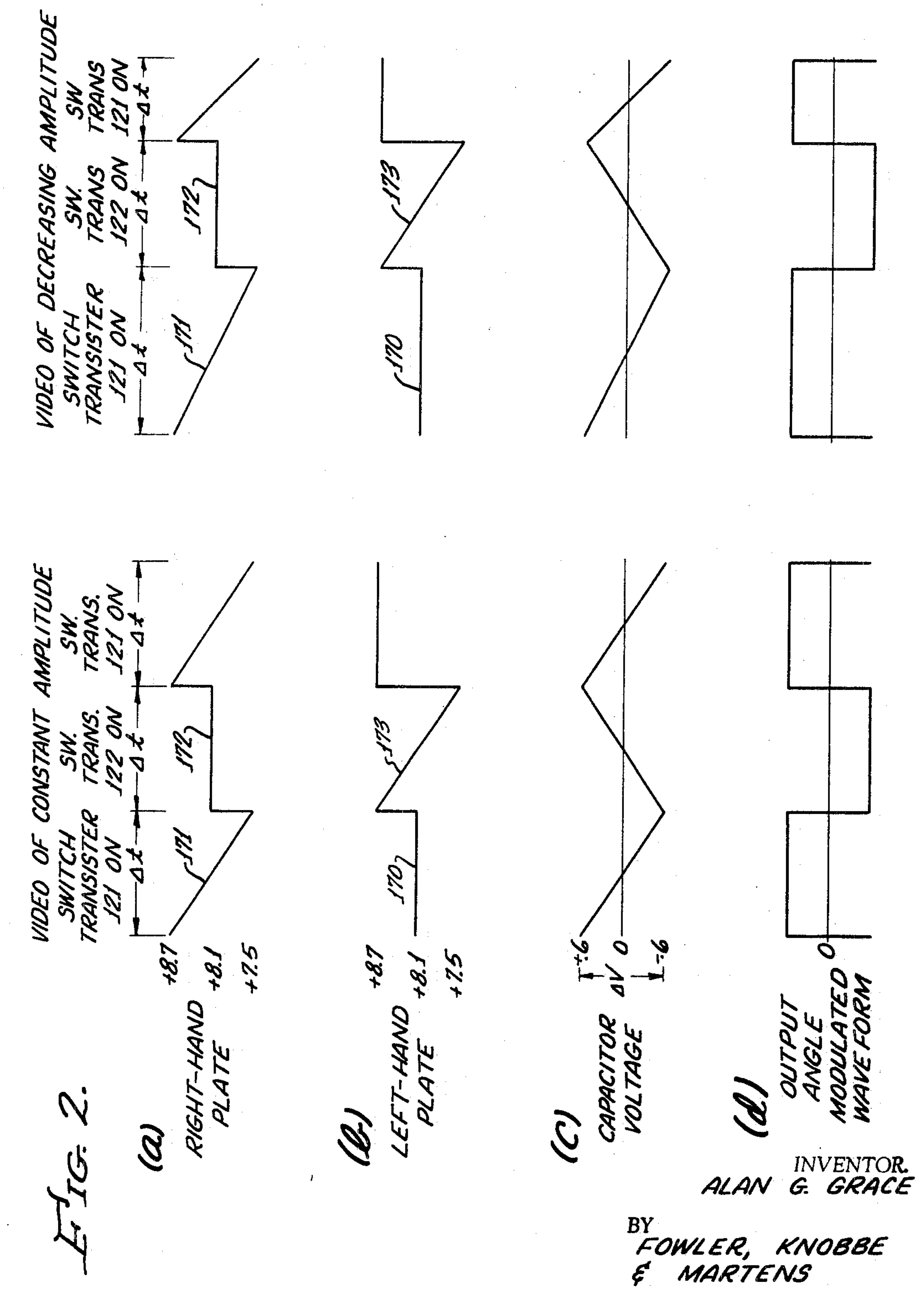

The voltage $v$ across the capacitor is shown in FIG. 2*c* and comprises a sawtooth function having a peak-to-peak amplitude ($\Delta v$) of 1.2 volts. It will be seen that during each charging period ($\Delta t$), the current *i* serves to discharge the capacitor from minus or plus 0.6 volt to a voltage of zero and charge the capacitor to a voltage of plus or minus 0.6 volt.

A significant feature of the present invention is that it provides an extremely linear angle modulator. Thus, $\Delta v$, the difference between the respective voltage levels at which the capacitor begins and ends each discharge and charge period is fixed by the circuit components. The charging current is proportional to the amplitude of the input video signal. Hence, $\Delta t$ is determined by the equation $$i=C\frac{dv}{dt} \qquad (2)$$

or $$\Delta t=\frac{C\Delta v}{i} \qquad (3)$$

The period $\Delta t$ is used for producing the desired angle modulated signal whose zero crossing points are linearly proportional to the amplitude of the applied video signal for a given modulating frequency signal.

The angle modulated signal is derived from transformer 128. During the alternate charging periods, the current flow through the ON switching transistor (121 or 122) is conducted through one of the secondary windings 127 or 128 of this transformer. As a result, a stepped up current pulse is provided at the primary winding 180 having a polarity in accordance with whichever of the switching transistors is turned ON. The output current, while providing the desired zero crossing points for angle modulation, also varies in amplitude because of the variation in the value of $i$ with variations in the magnitude of the input video signal, i.e. the signal on the secondary winding 180 contains some amplitude modulation.

This AM modulation is removed by limiter stage 200 which is connected to the secondary winding 180 by resistor 201. The limiter comprises the two limiting diodes 202 and 203. The anode of diode 202 and the cathode of diode 203 are AC decoupled by capacitor 204 and have a DC potential supplied via the potentiometer 205 connected to the +12 and −12 volt sources via respective resistors 206 and 207. Oppositely poled diodes 208 and 209 connect the opposite ends of the potentiometer to ground to maintain a potential of +.7 volt on one end of the potentiometer and −.7 volt on the other end. The network provides a means for changing by a few nanoseconds the conducting times of one or the other of the limiter diodes 202, 203, e.g. if the potentiometer is set to a small positive potential, diode 202 will conduct slightly sooner. This network is used to compensate for asymmetry in the waveform applied to node 210 from transformer 128 resulting from asymmetries in the transformer windings or minor variations between the circuit components. For example, the resistors used in the modulator circuit may have actual values differing from their marked values ±5% and the transistors of the selected type need not be specially matched. Also, the balance network corrects for any differences between the voltage-current characteristics of diodes 202 and 203 so that these components likewise do not have to be specially matched. As a result, the modulator circuit may be constructed in less time and with less expensive components.

Diodes 202 and 203 are advantageously very fast switching diodes, i.e. they switch in the order of 2 nanoseconds and break down at a potential of approximately .7 volt. Thus, diode 203 limits the positive swing of the voltage on node 203 to .7 volt and diode 202 limits the negative swing of this voltage to .7 volt. This hard limited, very fast switched waveform provides a symmetrical square wave on node 210 having a peak-to-peak amplitude of about 1.4 volts.

Node 210 is connected to the base of transistor 220. Transistor 220 and complementary NPN and PNP transistors 221 and 222 form an output driver stage of unity gain. The collector of the transistors 221 and 222 are respectively connected to the plus 12 volt and the minus 12 volt sources through resistors 252 and 253 and are connected to ground through respective decoupling capacitors 254 and 251. A pair of series connected diodes 248 and 249 connect the base of the transistors 221 and 222 to one another and a resistor 250 is connected between the base and collector of the transistor 222. For positive excursions, the output current is supplied by the NPN transistor 221 and for negative excursions, the output current is supplied by the PNP transistor 222. This output stage provides a very low impedance at node 225, e.g. of the order of resistance values of resistors 226 and 227 over a 10 megacycle bandwidth. Resistors 228 and 229 are series terminating resistors having an impedance selected to match the output cable connected to the output terminals 230 and 231. Typically, these output terminals are connected to the recording head driver of a video tape recorder and to a demodulator for monitoring the signal being recorded on magnetic tape.

I claim:

1. In a modulator for providing an output signal which is angle modulated in accordance with the amplitude of the input modulating signal, the combination comprising:
- (a) a capacitor;
- (b) first and second means, each for generating a current proportional to the amplitude of said input signal;
- (c) first and second switching means, each for completing a charge path from a respective one of said current generating means to said capacitor in response to the charging of said capacitor to a predetermined voltage by current thrrough the other of said switching means; and
- (d) first and second control transistors, each for cutting off a respective one of said switching means in response to conduction in the other one of said switching means.

2. A modulator according to claim 1, and additionally including a transformer having first and second primary windings coupled to said first and second switching means and also having a secondary winding, for providing a current flow in respectively opposite directions during said alternating charging periods.

3. A modulator for providing an output signal which is angle modulated in accordance with the amplitude of the input modulating signal comprising:
- (a) capacitor;
- (b) first and second means, each for generating a current proportional to the amplitude of said input signal;
- (c) first and second switching transistors connected by their emitters to respective plates of said capacitor to complete alternate charge paths from respective ones of said first and second current generating means to said capacitor in accordance with the voltage established across said capacitor by the currents from said first and second current generating means; and
- (d) first and second control transistors, each having its emitter-collector circuit connected between the collector of a respective one of said switching transistors and the base of the other of said switching transistors, so as to cut off each when the other conducts;
- (e) means responsive to the completion of said alternate charge paths to provide said output signal.

4. A modulator for providing an output signal which is angle modulated in accordance with the amplitude of the input modulating signal comprising:
- (a) capacitor;
- (b) first and second means, each for generating a current proportional to the amplitude of said input signal;
- (c) first and second switching transistors, each having its emitter connected to respective plates of said capacitor to complete a charge path from a respective one of said current generating means to said capacitor in response to the charging of said capacitor to a predetermined voltage by current though the other of said current generating means; and
- (d) first and second control transistors, each having its emitter-base junction responsively coupled to a respective one of said first and second switching transistors and its collector electrode coupled in a bias arrangement to the base electrode of the other one of said switching transistors so as to cut off each switching transistor in response to conduction of the other.

5. A modulator according to claim 4 wherein the base electrode of said first and second switching transistor is maintained at a voltage set by a Zener diode when its associated control transistor is OFF and is set to the Zener potential plus a voltage corresponding to the current flow through the associated control transistor when said control transistor is ON.

6. A modulator according to claim 4 wherein each of said first and second switching transistors has a collector load resistance having one end coupled to a supply potential and the other end coupled to the emitter-base junction of one of the control transistors.

7. A modulator for providing an output signal which is angle modulated in accordance with the amplitude of the input modulating signal comprising:

(a) a capacitor;
(b) first means for generating a current proportional to the amplitude of said input signal;
(c) second means for generating a current proportional to the amplitude of said input signal;
(d) first and second switching means, maintained in mutually exclusive states of conduction and nonconduction in accordance with the voltage of said capacitor, for supplying current in respectively opposite direction to said capacitor from said first and second current sources during alternate periods; and
(e) means, including a transformer having first and second primary windings coupled to said first and second switching means and also having a secondary winding, for providing a current flow in respectively opposite directions during said alternate periods.

8. A modulator for providing an output signal which is angle modulated in accordance with the amplitude of the input modulating signal comprising:

(a) a capacitor;
(b) first means for generating a current proportional to the amplitude of said input signal;
(c) second means for generating a current proportional to the amplitude of said input signal;
(d) means for alternately supplying current in respectively opposite directions to said capacitor from said first and second current sources to charge said capacitor from a first predetermined voltage to a second predetermined voltage; and
(e) means, including a transformer having first and second primary windings coupled to said first and second switching means and also having a secondary winding, for providing a current flow in respectively opposite directions during said alternating charging periods.

9. A modulator for providing an output signal which is angle modulated in accordance with the amplitude of the input modulating signal comprising:

(a) a capacitor;
(b) first means for generating a current proportional to the amplitude of said input signal;
(c) second means for generating a current proportional to the amplitude of said input signal;
(d) means for alternately supplying current in respectively opposite directions to said capacitor from said first and second current sources to charge said capacitor from a first predetermined voltage to a second predetermined voltage; and
(e) means responsive to said alternating charging periods for providing said output signal, said means including first and second oppositely poled diodes having a first common junction of an anode of one of said diodes and the cathode of the other of said diodes connected to said waveform and a second common junction of the other anode and cathode connected to a predetermined voltage, said diodes being forwardly biased by respectively opposite portions of said waveform to limit the amplitude of the output waveform to the breakdown potential of said diodes.

10. A modulator according to claim 9 and additionally including a balance network for supplying a variable potential to said first common junction of said diodes for compensating for asymmetry in said waveform and for compensating for voltage current differences between said diodes.

11. A modulator for providing an output signal which is angle modulated in accordance with the amplitude of the input modulating signal comprising:

(a) a capacitor;
(b) first means for generating a current proportional to the amplitude of said input signal;
(c) second means for generating a current proportional to the amplitude of said input signal;
(d) means for alternately supplying current in respectively opposite directions to said capacitor from said first and second current sources to charge said capacitor from a first predetermined voltage to a second predetermined voltage; and
(e) means responsive to said alternating charging periods for providing said output signal, said means including
   (1) a transformer having first and second primary windings coupled to said first and second switching means and also having a secondary winding for providing a current flow in respectively opposite directions during said alternate charging periods; and
   (2) a limiter stage connected to said secondary winding for limiting the amplitude of the output waveform corresponding to said alternate charging periods so as to provide a symmetrical square wave angle modulated signal.

12. A modulator according to claim 11 wherein said limiter stage includes first and second oppositely poled diodes having a first common junction of an anode of one of said diodes and the cathode of the other of said diodes connected to said waveform and a second common junction of the other anode and cathode connected to a predetermined voltage, said diodes being forwardly biased by respectively opposite portions of said waveform to limit the amplitude of the output waveform to the breakdown potential of said diodes.

13. A modulator according to claim 11 wherein said means for supplying alternating current in respectively opposite directions to said capacitor includes first and second switching means maintained in mutually exclusive states of conduction and nonconduction in accordance with the voltage on said capacitor.

14. A modulator according to claim 13 wherein said first and second switching means comprise:

(a) first and second transistors whose emitters are connected to respectively opposite plates of said capacitor; and
(b) control means coupled to the base electrodes of said switching transistors for turning OFF one of the transistors when the emitter of the other of said transistors is changed to a predetermined voltage as a result of charging of said capacitor.

15. A modulator according to claim 14 wherein said control means includes an additional pair of transistors having their emitter-base junction responsively coupled to respective ones of said first and second switching transistors and their collector electrodes coupled in a bias arrangement to the base electrodes of respectively opposite ones of the first and second switching transistors.

16. A modulator according to claim 15 wherein the base electrode of said first and second switching transistor is maintained at a voltage set by a Zener diode when its associated control transistor is OFF and is set to the Zener potential plus a voltage corresponding to the current flow through the associated control transistor when said control transistor in ON.

17. A modulator according to claim 16 wherein each of said first and second switching means has a collector load resistance having one end coupled to a supply potential and the other end coupled to the emitter-base junction of one of the control transistors.

References Cited

UNITED STATES PATENTS 3,167,726 1/1965 Foerster ---------- 332—14 X
3,253,237 5/1966 Runyan --------- 331—113 X
3,290,617 12/1966 Bellem ------------- 332—14
3,371,288 2/1968 Dann ------------ 331—113 X ALFRED L. BRODY, Primary Examiner U.S. Cl. X.R.

307—246, 291; 330—30; 331—113; 332—24, 43